United States Patent
Fukuoka

(10) Patent No.: US 7,272,326 B2
(45) Date of Patent: Sep. 18, 2007

(54) OPTICAL RECEIVER AND AN OPTICAL COMMUNICATION SYSTEM USING THE SAME

(75) Inventor: Takashi Fukuoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 707 days.

(21) Appl. No.: 10/606,154

(22) Filed: Jun. 26, 2003

(65) Prior Publication Data

US 2004/0042235 A1    Mar. 4, 2004

(30) Foreign Application Priority Data

Jun. 26, 2002    (JP)    ............... 2002-186512

(51) Int. Cl.
*H04B 10/00*    (2006.01)

(52) U.S. Cl. ........................ 398/208; 398/210

(58) Field of Classification Search ......... 398/202–214
See application file for complete search history.

(56) References Cited

U.S. PATENT DOCUMENTS 5,999,289 A * 12/1999 Ihara et al. ................. 398/147
6,907,202 B1 * 6/2005 Ide et al. .................... 398/208
2002/0123851 A1    9/2002 Kurooka et al.
2003/0222737 A1 * 12/2003 Mordkovich ................ 333/204
2004/0013435 A1 * 1/2004 Eiselt et al. ................. 398/140

OTHER PUBLICATIONS

Ko et al., Low power, tunable active inductor ans its applications to monolithic VCO and BPF, Jun. 8-13, 1997, IEEE MTT-S Digest, vol. 2, p. 932.*

* cited by examiner

*Primary Examiner*—Agustin Bello
(74) *Attorney, Agent, or Firm*—McDermott Will & Emery LLP

(57) ABSTRACT

According to the present invention, an optical communication system is provided, in which a high reliability, a high quality and a low cost transmission are realized. The signal light reached to the optical receiver is detected and converted to an electrical signal by the optical-to-electrical converter. The electrical signal is inputted to the filter that has a convex characteristic with a peak frequency between 2 GHz to 4 GHz, which compensates the frequency characteristic of the signal light. Namely, a concave characteristic of the signal light with a bottom frequency between 2 GHz and 4 GHz due to the accumulated dispersion of the optical transmission path can be compensated.

6 Claims, 13 Drawing Sheets

100 ps 100 ps 100 ps

OPTICAL RECEIVER AND AN OPTICAL COMMUNICATION SYSTEM USING THE SAME

BACKGROUND OF THE INVENTION

1. Field of the Invention

This invention relates to an optical communication system and an optical receiver used in the optical communication system.

2. Related Prior Art

An optical communication system comprises an optical transmitter, an optical path and an optical receiver. The optical transmitter transmits signal light into the optical path, the optical path propagates the signal light and the optical receiver receives the propagated light. The optical communication system has an ability to send a huge amount of information with a high speed. To secure a quality of the propagated signal light, it is required to reduce an absolute dispersion accumulated from the transmitter to the receiver on the optical path.

On the other hand, typical optical fiber used in the optical communication system shows a zero-dispersion wavelength around 1.3 μm band, while a finite dispersion of +16 ps/nm/km around 1.55 μm band where the optical communication system is performed. In the case that the optical path is constructed by such conventional optical fiber alone, the large dispersion will cause to deteriorate of the quality of the transmission signal.

To overcome the deterioration of the transmission quality due to large accumulated dispersion, a means for correcting the dispersion is placed on the optical path. The dispersion-correcting means has a negative dispersion to compensate the finite dispersion, which is a positive amount, of the optical path. The dispersion correcting means is a dispersion-correcting fiber, for example. To adjust a ratio of a length of the single mode optical fiber, which is used in the optical path, to that of the dispersion-correcting fiber, the accumulated dispersion can be reduced, whereby enhancing the quality of the transmitted signal light.

However, the single mode fibers that are used in the optical path have various lengths and the dispersion attributed thereto show various values. Also, dispersion of the dispersion correcting-fibers has various values. Further, the optical transmitter and the optical receiver have respective tolerance for the dispersion. Therefore, the optical communication system should be designed by taking the above mentioned factors into account, which raises a designing cost and a management cost of the communication system.

Further, Since the dispersion-correcting fiber has a large transmission loss, several optical amplifiers to amplify the signal light must be installed on the optical path, which raises the cost for construction of the optical system. Moreover, because optical amplifiers accompany optical noises, the cost is required for reduce such optical noises to maintain the quality of the signal light. Also, distortion due to a non-linear effect in the optical fiber causes the deterioration of the transmitted signal light, because an output of the optical amplifier becomes so high that the non-linear effect of the optical fiber must be taken into account, which raises the cost of the communication system.

SUMMARY OF THE INVENTION

According to one aspect of the present invention, an optical receiver comprises an optical-to-electrical converter, a current-to-voltage converter and a filter. The receiver receives a signal light transmitted through an optical fiber and affected by an accumulated dispersion of the optical fiber. Therefore, the signal light received by the optical receiver has a frequency dependence due to the dispersion of the optical fiber. The optical-to-electrical converter converts the optical signal to an electrical current, and the current-to-voltage converter converts the electrical current to a voltage signal. The filter receives the voltage signal and outputs an electrical signal corresponding to the signal light received by the optical-to-electrical converter so that the filter compensates the frequency dependence of the signal light.

The filter may have a frequency response that the convex characteristic with a peak frequency from 2 GHz to 4 GHz. Since the frequency dependence of the signal light affected by the accumulated dispersion of the optical fiber shows an concave response at a frequency from 2 GHz to 4 GHz, the filter may compensates the convex dependence of the signal light.

The optical receiver according to the present invention may further have (control signal generator. The control signal generator includes a band-pass filter with a center frequency and a divider. The band-pass filter receives the voltage signal output from the current-to-voltage converter and outputs a filtered signal, the magnitude of which corresponds to that of the voltage signal at the center frequency. The divider receives the voltage signal from the current-to-voltage converter and the filtered signal from the band-pass filter, and output a control signal that is the ratio of the filtered signal to the voltage signal. The peak frequency of the filter may be changed by the control signal from the control signal generator.

The filter may include an inductor. The inductance of the inductor may be changed by the control signal from the control signal generator. Therefore, the frequency response of the filter may be varied dynamically.

Figure 6:
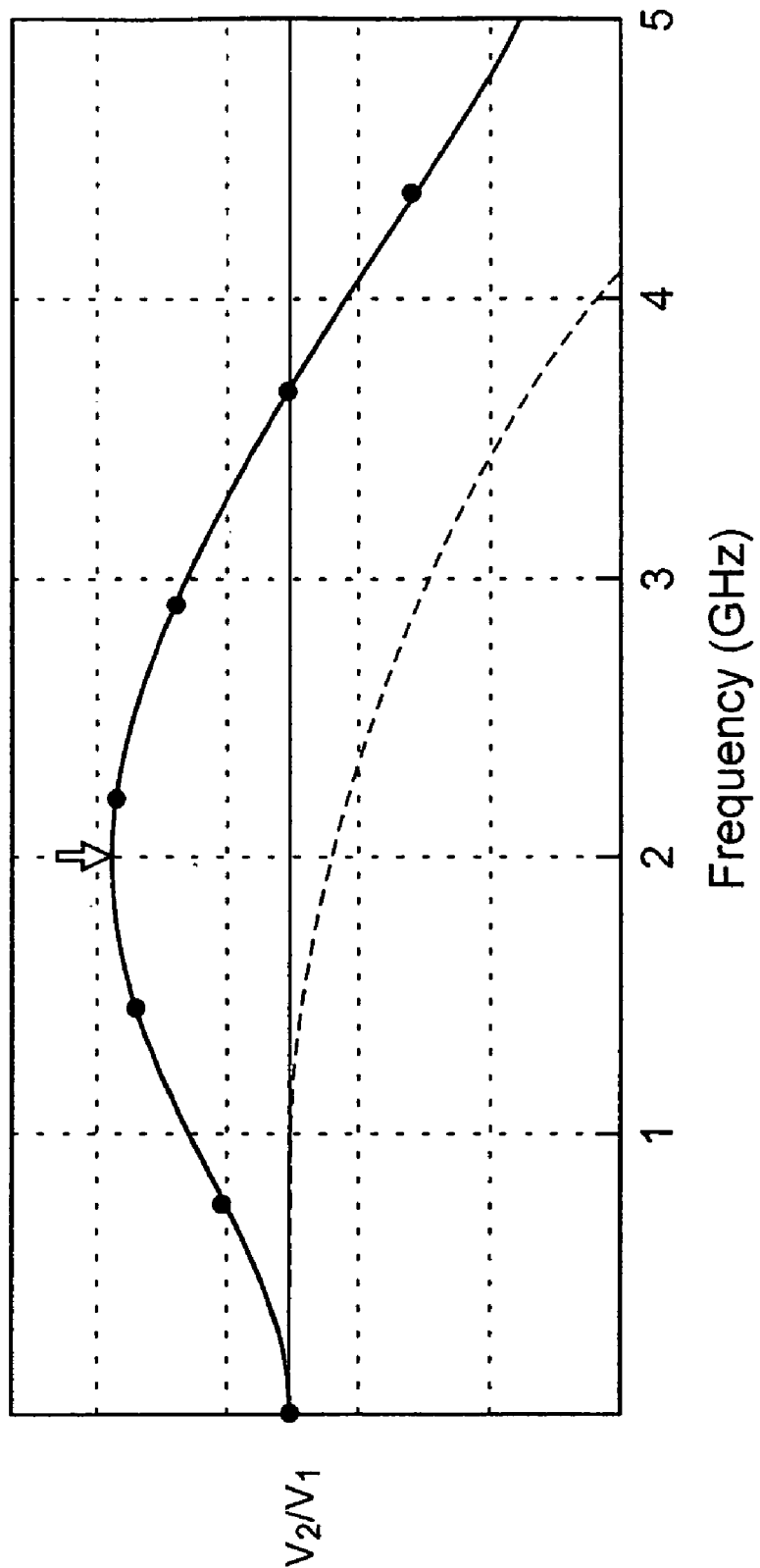
Figure 7:
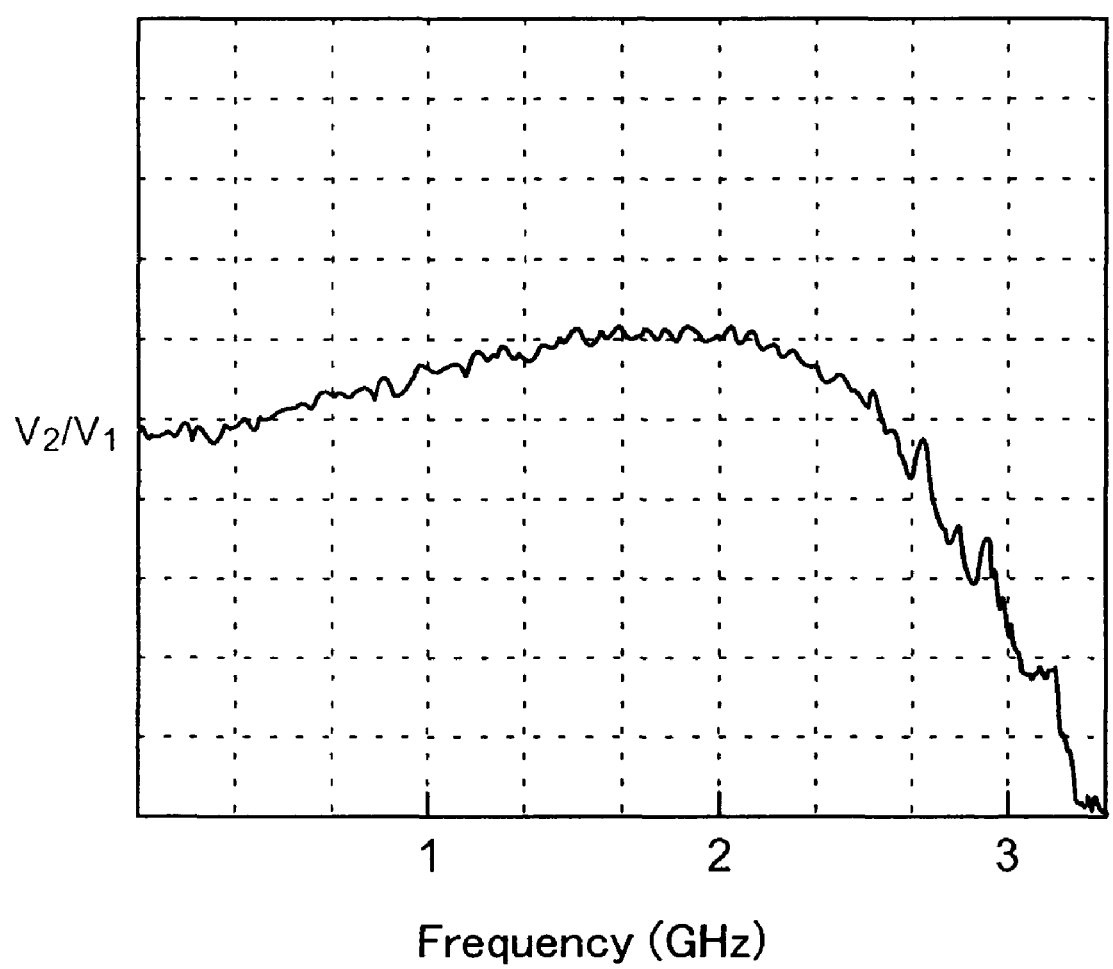
Figure 8:
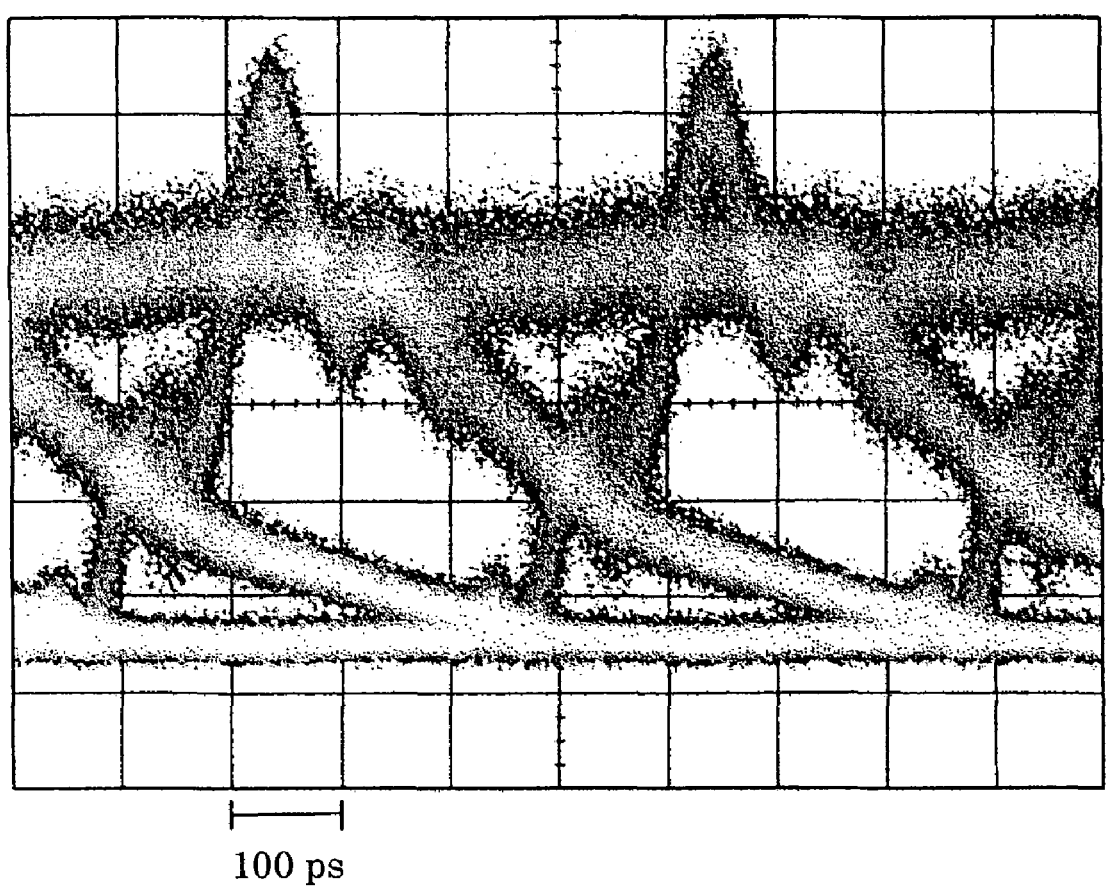
Figure 9:
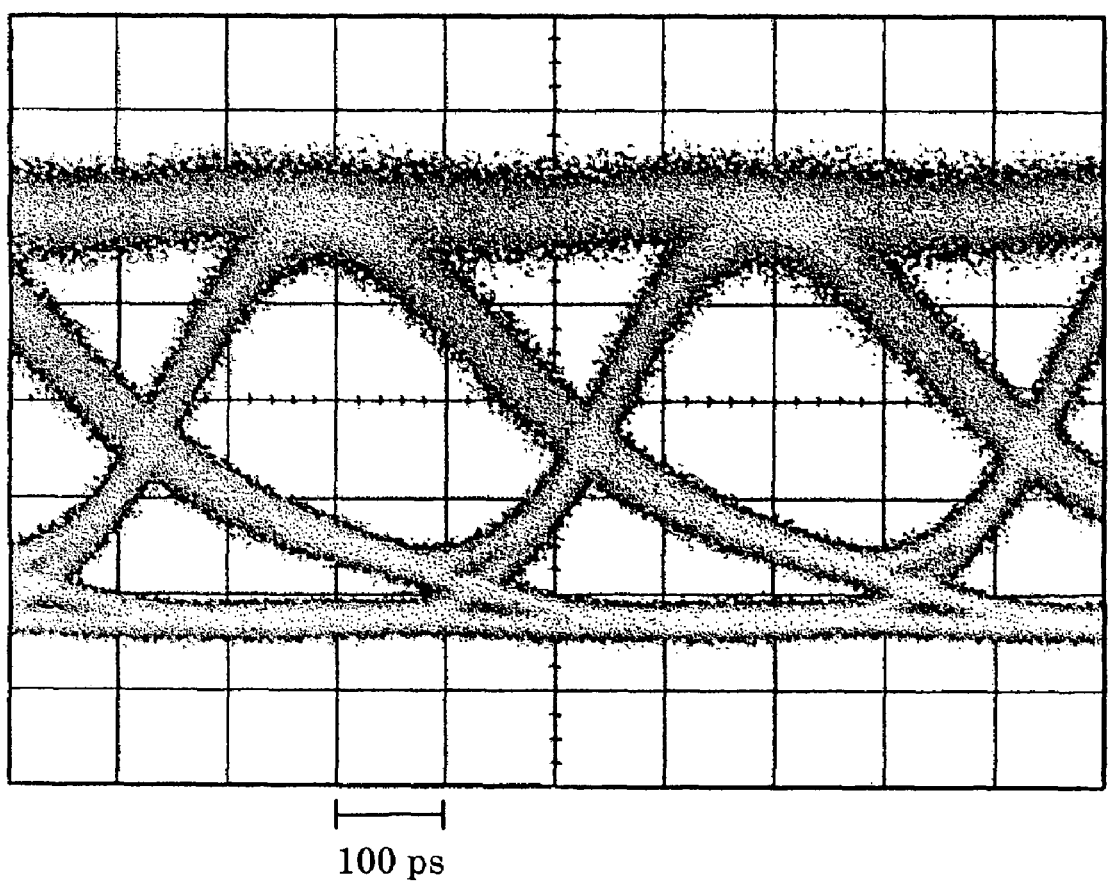
Figure 10:
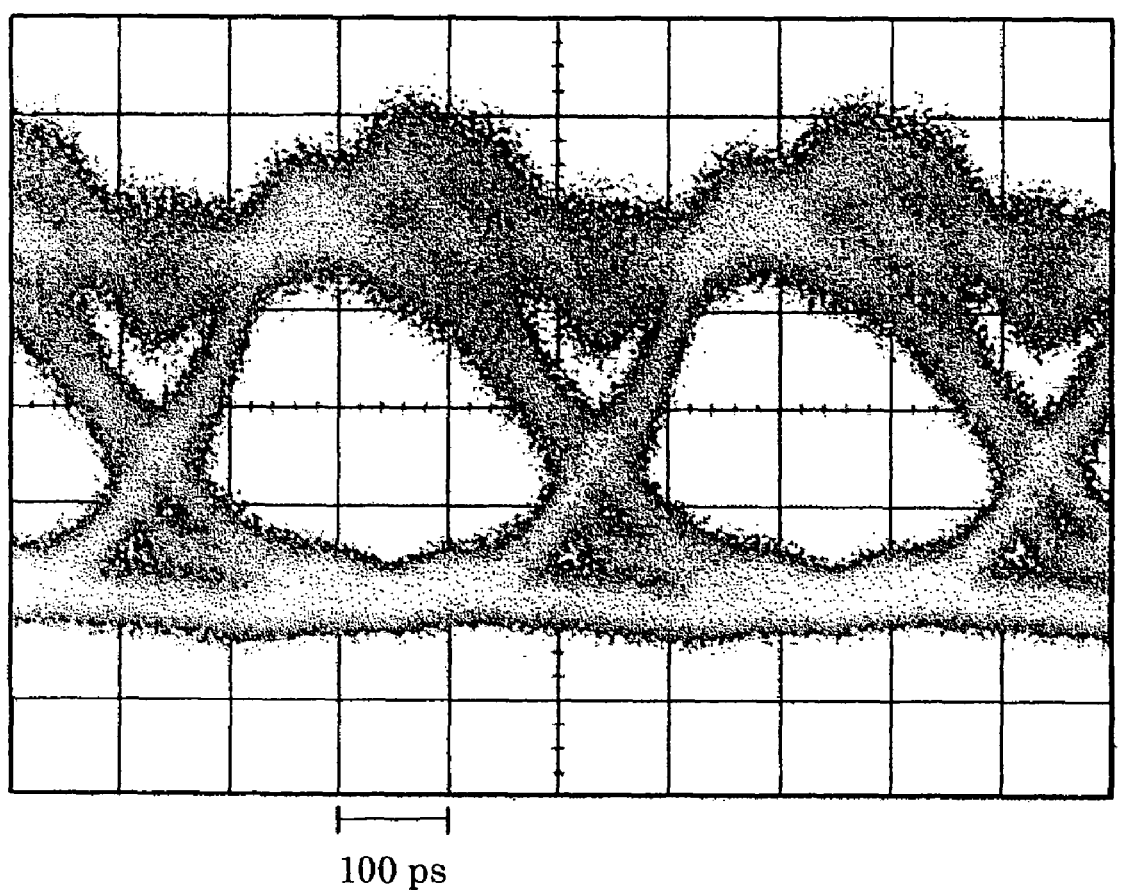
Figure 11:
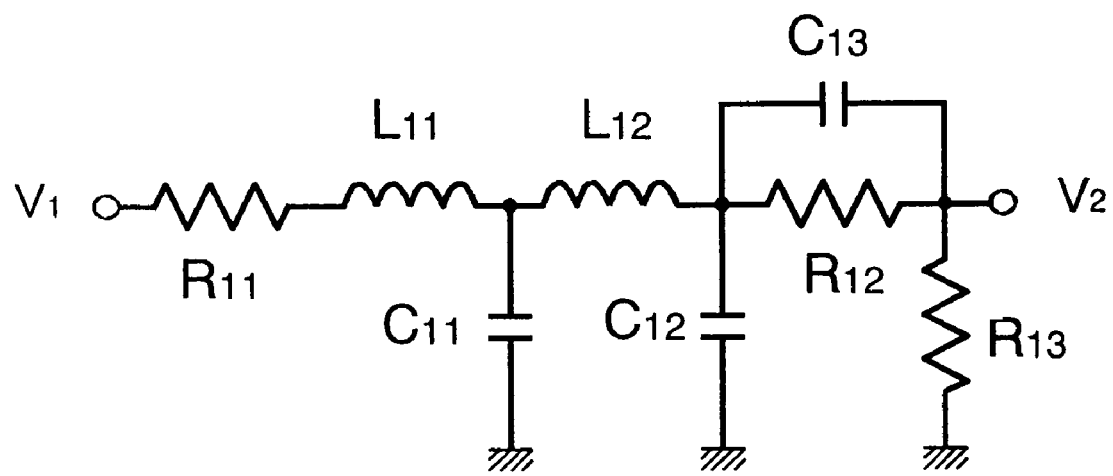
Figure 12:
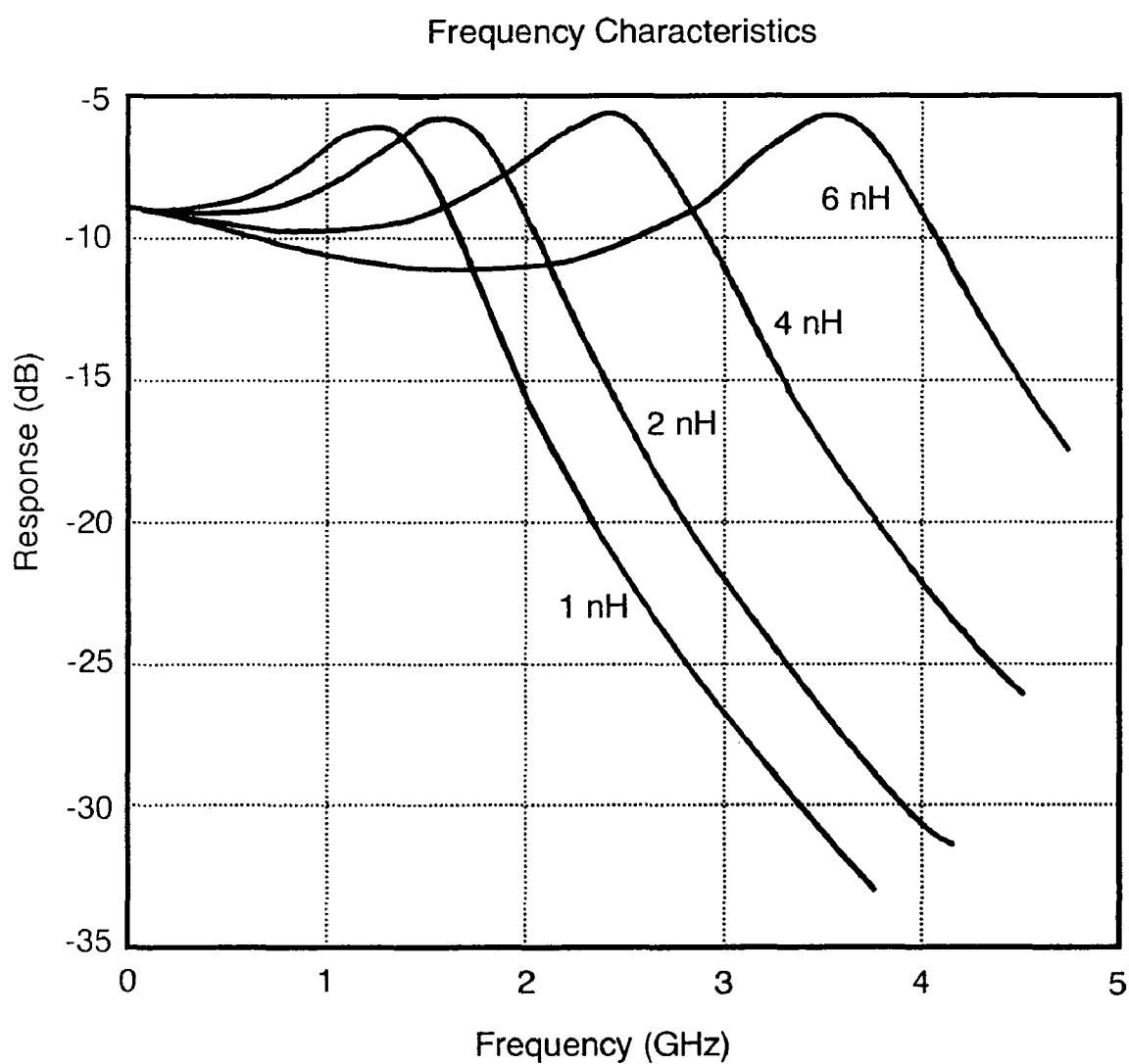
Figure 13:
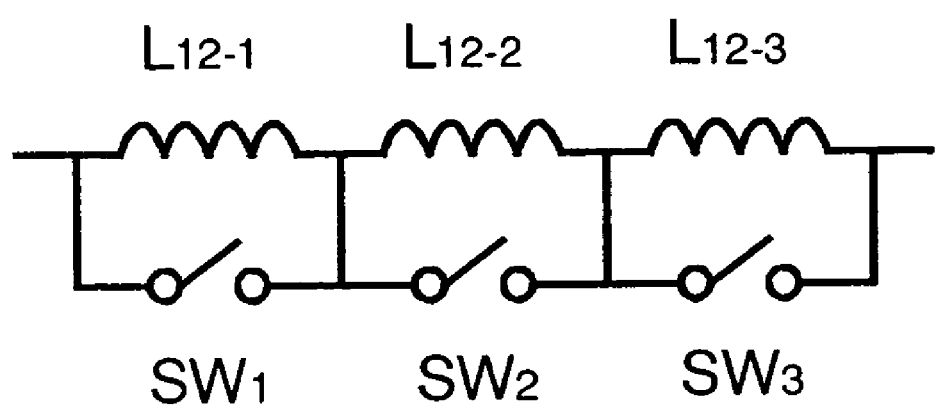

FIGS. from 5A to 5D show frequency responses of the signal light transmitted through the optical fiber taking the effect of the laser chirping, which is calculated from the line width enhancement factor, into account;

FIG. 6 shows a calculated frequency characteristic of the filter according to the first embodiment;

FIG. 7 is a measured frequency characteristic of the filter;

FIG. 8 is a monitored waveform of the optical signal;

FIG. 9 is a monitored waveform of the output signal without the filter of the present invention;

FIG. 10 is a monitored waveform of the output signal with the filter;

FIG. 11 is a second embodiment of the filter circuit;

FIG. 12 shows frequency responses of the filter of the second embodiment with the inductance as a parameter; and FIG. 13 is an embodiment to change the inductance dynamically.

DETAILED DESCRIPTION OF PREFERRED EMBODIMENTS

Preferred embodiments of the present invention will be described in detail as referring to drawings.

Figure 1:
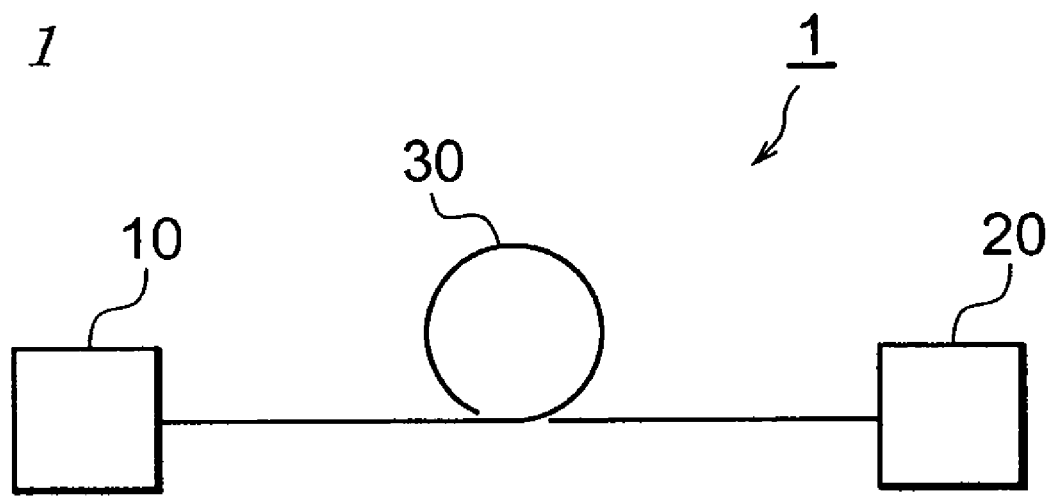
FIG. 1 shows an optical communication system.

First, a configuration of an optical receiver according to the present invention will be described. FIG. 1 is a block diagram showing the configuration of the optical communication system 1. The system 1 comprises an optical transmitter 10, an optical receiver 20, and an optical transmission path 30 made of an optical fiber. A signal light modulated by amplitude is transmitted from the optical transmitter 10, propagates in the optical path 30 and is received by the optical receiver 20.

First Embodiment

Figure 2:
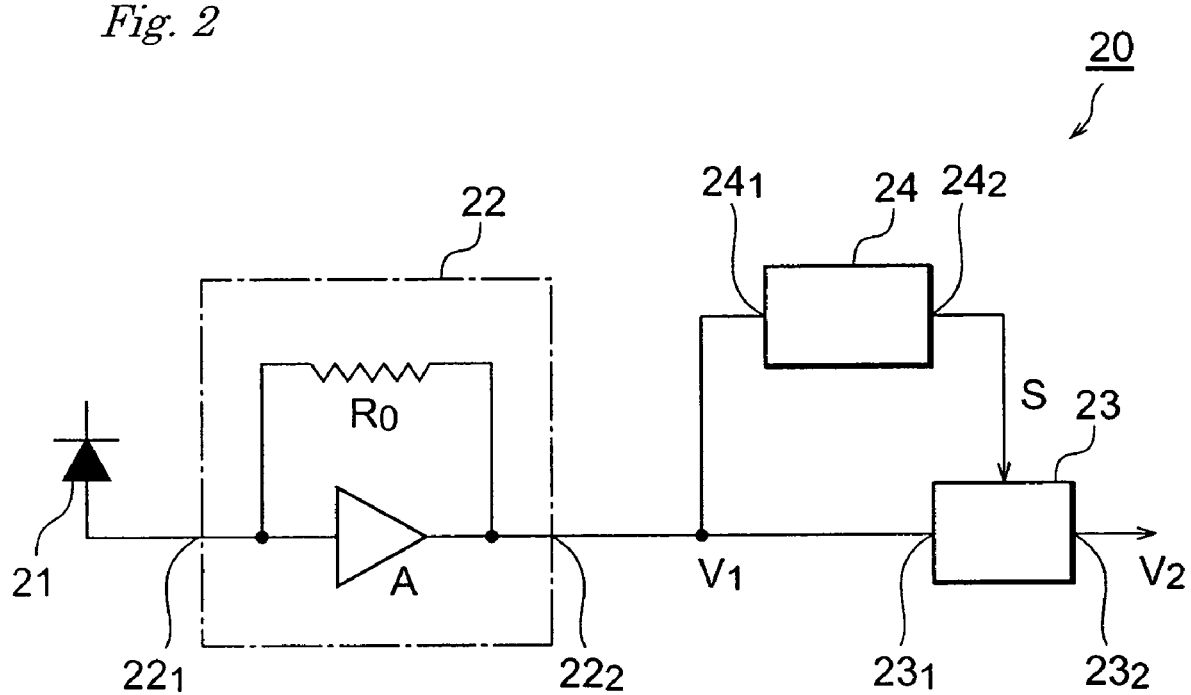
FIG. 2 is a block diagram of an optical receiver according to the present invention.

FIG. 2 is a block diagram of the optical receiver 20. The optical receiver 20 comprises an optical-to-electrical converter 21, a current-to-voltage converter 22, a filter 23 and a controlling-signal generator 24. The optical-to-electrical converter 21 receives the signal light propagated in the optical path 30, and generates a signal current corresponding to a magnitude of the signal light. The optical-to-electrical converter 21 may be made of an Avalanche Photodiode. The current-to-voltage converter 22 has an input-terminal $22_1$, an output-terminal $22_2$, an amplifier A and a resistor $R_0$ connected to the amplifier in parallel and inserted between the input-terminal and the output terminal. The current-to-voltage converter 22 converts the current generated by the optical-to-electrical converter 21 and inputted to the input terminal $22_1$ to a corresponding voltage signal $V_1$ and outputs to the output terminal $22_2$.

The filter 23 has a peak characteristic at a frequency from 2 GHz to 4 GHz. The voltage signal $V_1$, which is output from the output terminal $22_2$ of the current-to-voltage converter 22, is inputted at the input terminal $23_1$ of the filter 23 and outputs a filtered signal $V_2$ from the output terminal $23_2$. The frequency characteristic of the filter 23 may be variable.

The control signal generator 24 receives the voltage signal $V_1$ from the current-to-voltage converter 22 at the input terminal $24_1$, detects a magnitude of the $V_1$ at a frequency, and outputs a control signal S based on the magnitude of the $V_1$ from the output terminal $24_2$. The control signal S controls the frequency characteristic of the filter 23. Thus, the frequency response of the filter 23 is adjusted by the control signal S.

Figure 3:
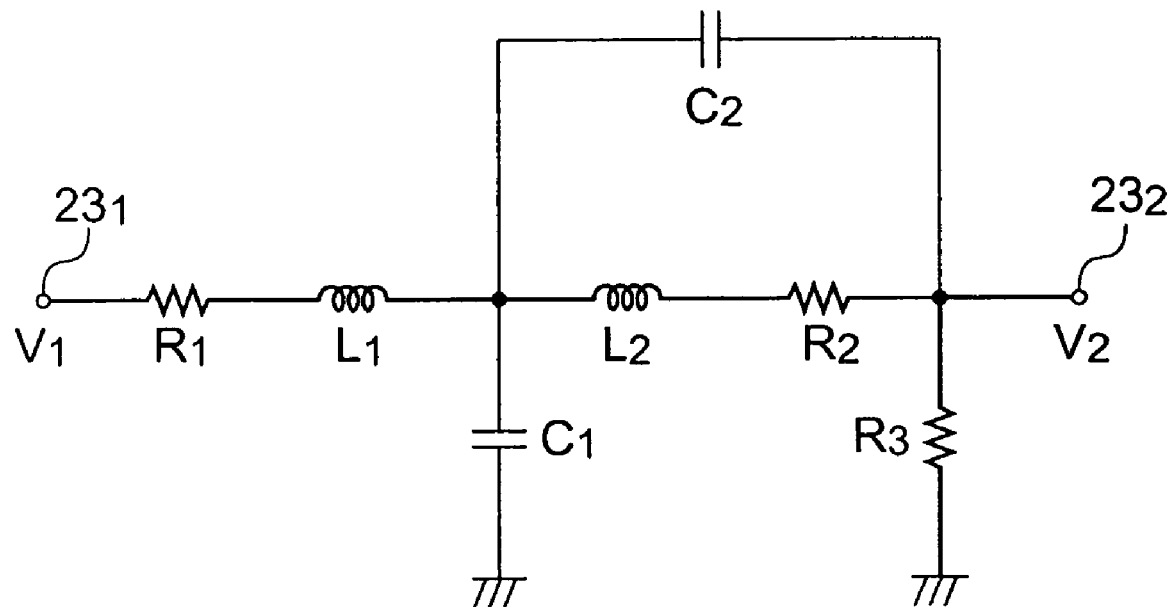
FIG. 3 shows a first embodiment of the filter circuit according to the present invention.

FIG. 3 shows an example of the filter 23. In FIG. 3, the filter comprises resisters $R_1$ to $R_3$, inductors $L_1$ and $L_2$, and capacitors $C_1$ and $C_2$. From the input terminal $23_1$ of the filter to the output terminal $23_2$, a combination of $R_1$, $L_1$, $L_2$, and $R_2$ are connected in series. A node between $L_1$ and $L_2$ is connected to the ground through capacitor $C_1$ and also connected to the output terminal $23_2$ of the filter 23 through capacitor $C_2$. The output terminal $23_2$ is grounded through resistor $R_3$. By adjusting resistance of resistors from $R_1$ to $R_3$, inductance of inductors $L_1$ and $L_2$, and capacitance of capacitor $C_1$ and $C_2$, the frequency characteristic of the filter 23 that has convex with a peak at a desired frequency can be obtained.

Figure 4:
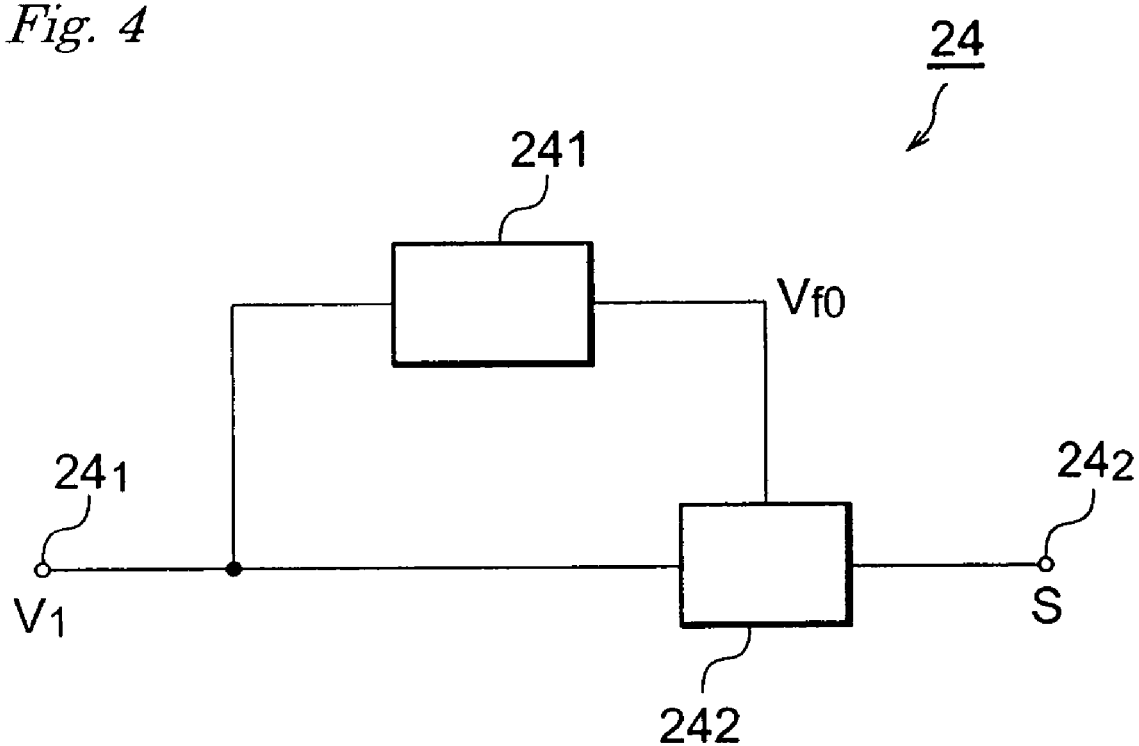
FIG. 4 is a block diagram of the control signal generator.
Figure 5A:
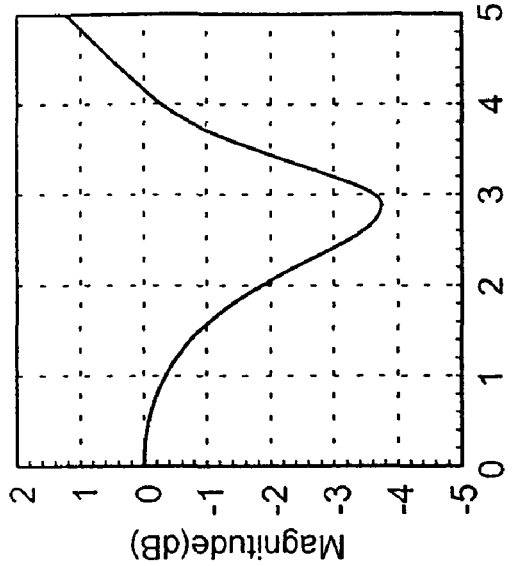
Figure 5B:
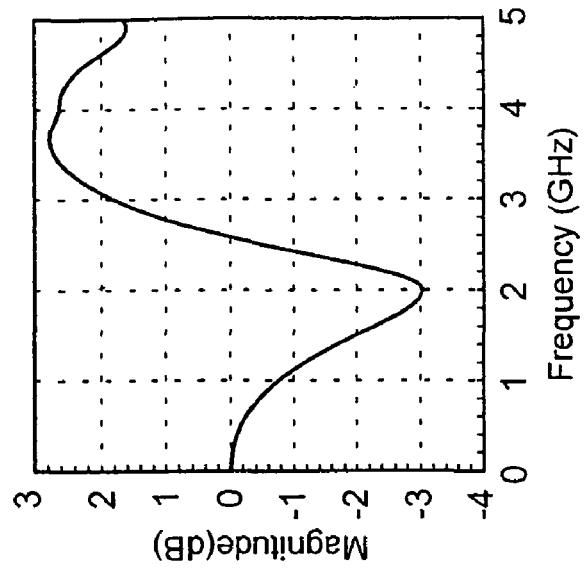
Figure 5C:
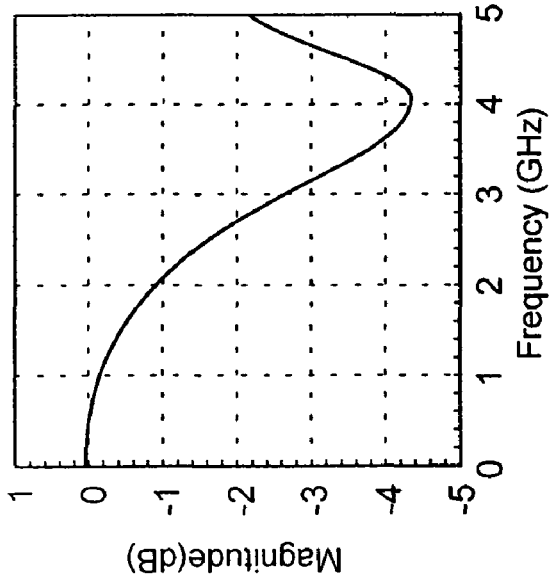
Figure 5D:
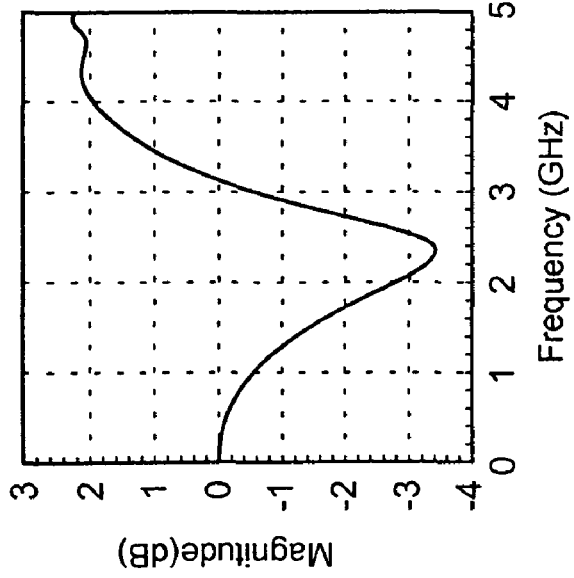

FIG. 4 shows a block diagram of the control signal generator 24. The control signal generator involves a band-pass filter $24_1$ and a divider $24_2$. The band-bass filter $24_1$ filters a unique signal $V_{f0}$ with the frequency component $f_0$ from the input signal to the input terminal $24_1$. The divider $24_2$ calculates a ratio of the filtered signal $V_{f0}$ to the input signal $V_1$ and generates the control signal S based on this calculation. By selecting the filtering frequency $f_0$ of the band-pass filter, calculating the ratio $V_{f0}/V_1$ attributed to this filtering frequency, and generating the control signal S, the frequency response of the filter 23 can be adjusted by this control signal S.

An operation of the optical communication system 1 based on the present embodiment will be described. A signal light that is amplitude-modulated and output from the optical transmitter 10 propagates in the optical path 30 and reaches the optical receiver 20. In the optical receiver, the optical-to-electrical converter detects the signal light and generates the corresponding photo-current. This photo-current is converted to a voltage form $V_1$ by the current-to-voltage converter 22. The filter 23 adjusts the frequency response of the signal $V_1$ and outputs the adjusted signal $V_2$. The control signal generator 24 detects the signal component, which has the center frequency $f_0$ and the quite narrow spectral width, and calculates the amount of the adjustment of the filter 23. The frequency characteristic of the filter 23 thus adjusted has a convex response with a peak frequencies from 2 GHz to 4 GHz.

On the other hand, the signal light reached the optical receiver has a concave characteristic at frequencies from 2 GHz to 4 GHz due to the accumulated dispersion of the optical path. Therefore, the frequency response of the signal light reached the optical receiver 20 and that of the filter 23 compensates with each other, and the voltage signal $V_2$ output from the filter has a waveform with a relatively reduced distortion.

Figures from FIGS. 5A to 5D show results of the simulation that the signal light of 1.55 μm wavelength band with a frequency shift Δν, which is denoted by the equation $$\Delta \nu = -\frac{\alpha}{4\pi}\frac{d}{dt}\ln(P(t))$$

where P(t) is the optical output power of the source and α is the line width enhancement factor, propagates in the single mode optical fiber with a length of 100 km and accumulated dispersion of 1600 ps/nm, and finally reaches the optical receiver. The magnitude of α are −1, −2, −3, and −4 for FIG. 5A, FIG. 5B, FIG. 5C and FIG. 5D, respectively. In a typical distributed feedback laser (DFB-laser), is from −2 to −3.

As shown in figures, the frequency characteristic of the signal light at the input of the optical receiver has a bottom in the regions from 2 GHz to 4 GHz. On the other hand, the filter 23 of the present embodiment has a peak at the regions from 2 GHz to 4 GHz. Moreover, the optical-to-electrical converter 21 to the current-to-voltage converter 22 have a flat frequency response relatively to that of the filter. Therefore, the frequency response of the filter 23 compensates that of the signal light appeared in the input of the optical receiver whereby the signal $V_2$ output from the filter 23 can be reduced in the deformation of the waveform.

FIG. 6 and FIG. 7 show the typical frequency response of the present embodiment. FIG. 6 is a result of the circuit simulation, while FIG. 7 shows an experimental result. In both cases, the same circuit diagram is used. Practical values of circuit elements as follows: $R_1$=40 Ω, $R_2$=50 Ω, $R_3$=50 Ω, $L_1$=3 nH, $L_2$=1 nH, $C_1$=1 pF, and $C_2$=3 pF, respectively. For a comparison, the frequency response of the Bessel-Thomson filter is also shown in FIG. 6, which is typically used in a conventional optical receiver. From FIG. 6, the frequency response of the filter 23 has a peak at frequency around 2 GHz. The frequency response of the filter 23 can be adjusted by modifying resistance of resistors, capacitance of capacitors and/or inductance of inductors by the control signal S from the control-signal generator 24. For example, the peak frequency $f_0$ shifts to lower frequency by increasing the capacitance of $C_1$ and decreasing the capacitance $C_2$, while the peak frequency $f_0$ shifts to upper side by decreasing the resistance of $R_1$ and increasing the resistance $R_3$.

FIG. 8 shows an eye-diagram of the signal light reached the optical receiver and FIG. 9 is the eye-diagram of the output of the Bessel-Thomson filter when the signal light shown in FIG. 8 reaches the optical receiver with and passes the Bessel-Thomson filter. On the other hand, FIG. 10 shows the eye-diagram of the output from the filter 23 according to the present embodiment when the signal light shown in FIG. 8 is entered into the optical receiver 20. In the cases of FIG. 9 and FIG. 10, the optical fiber between the optical transmitter 10 and the optical receiver 20 is the single mode fiber, the length of which is 100 km with the accumulated dispersion about 1600 ps/nm.

As shown in FIG. 8, the signal light propagated through the optical fiber of 100 km length and reached the optical receiver 20 has a distorted waveform in the transition from a high-level to a low-level, namely the gradual slope from the high-level to the low-level, due to the accumulated dispersion of the optical path. Such distorted signal light is received by the optical receiver and the corresponding electrical signal output from the current-to-voltage converter 22 is inputted to the filter 23.

In the case that the filter is the conventional Bessel-Thomson filter that has no peak response to the frequency, the signal output from the filter reflects the gradual slope of the signal light as shown in FIG. 9. On the other hand in FIG. 10, the filter according to the present embodiment compensates the gradual slope of the signal light and the output thereof shows a steep transition.

Second Embodiment

FIG. 11 shows another circuit for the filter 23. The circuit comprises three resistors $R_{11}$, $R_{12}$ and $R_{13}$, three capacitors $C_{11}$, $C_{12}$, and $C_{13}$, and two inductors $L_{11}$ and $L_{12}$. Tow combinations of $R_{11}$, $L_{11}$ and $C_{11}$, and $L_{12}$ and $C_{12}$, respectively constitute low pass filters, while that of $C_{13}$ and $R_{13}$ constitutes a high pass filter. Therefore, this circuit functions as a band pass filter. FIG. 12 shows a frequency responses of the filter in FIG. 11. As shown in the figure, the peak frequencies change from 1.3 GHz to 3.5 GHz as inductance of the inductor $L_{12}$ changes from 1 nH to 6 nH, while peak responses are constant.

One example for changing the inductance of the inductor $L_{12}$ is shown in FIG. 13. In FIG. 13, plural inductors, each inductors are accompanied with a switch, are connected in series. Inductors whose accompanied switch is turned off contribute the filtering response. When the inductance of inductors $L_{12-1}$, $L_{12-1}$ and $L_{12-3}$ is 1 nH, 2 nH and 3 nH, respectively, and the $SW_1$ and $SW_3$ are turned off while the $SW_2$ is turned on, the total inductance will be 4 nH. By controlling the combination of turned-off switch by the control signal from the control signal generator, the frequency response of the filter 23 can be dynamically changed, whereby the depression of the frequency response appeared in the signal light due to the accumulated dispersion of the optical path can be effectively compensated.

Thus, by using the optical receiver 20 and the system 1 according to the present invention, the optical communication with a high quality may be realized, by which the distorted waveform of the signal light due to the accumulated dispersion of the optical path can be solved without installing any dispersion compensating fiber. Moreover, optical amplifiers to compensate the loss in the optical dispersion fiber may be cancelled, whereby reduction of the cost to design and to manage the optical communication system. Even in the case that the optical path is broken and is changed to the extra path using another optical fiber with dispersion different to the broken fiber, the present optical receiver may solve the problem of the distorted waveform due to the accumulated dispersion of the changed optical fiber.

From the invention thus described, it will be obvious that the invention and its application may be varied in many ways. For example, the configuration of the filter 23 may be other combinations of circuit elements and that of the control-signal generator 24 may be changed to other circuit. Such variations are not to be regarded as a departure from the spirit and scope of the invention, and all such modifications as would be obvious to one skilled in the art are intended for inclusion within the scope of the following claims.

What is claimed is:

1. An optical receiver for receiving a signal light propagated from an optical path, the signal light having a concave frequency response influenced by an accumulated dispersion of the optical path, the optical receiver comprising:

an optical-to-electrical converter for converting the signal light to an electrical current;

a current-to-voltage converter for receiving the electrical current from the optical-to-electrical converter and for outputting a voltage signal corresponding to the electrical current;

a first filter with a convex frequency response having a peak frequency to compensate the concave frequency response of the signal light, the first filter filtering the voltage signal from the current-to-voltage converter and outputting an electrical signal corresponding to the signal light; and a control signal generator having a second filter and a divider, the second filter, which is a band-pass filter, receiving the voltage signal from the current-to-voltage converter to filter and outputting a filtered signal with a magnitude at a center frequency of the band pass filter, the divider outputting a control signal to the first filter by receiving the voltage signal from the current-to-voltage converter and the filtered signal from the second filter, the control signal being a ratio of the filtered signal to the voltage signal, wherein the peak frequency of the first filter is varied by the control signal from the control signal generator.

2. The optical receiver according to claim 1, wherein the peak frequency of the first filter is from 2 GHz to 4 GHz.

3. The optical receiver according to claim 1, wherein the first filter includes at least an inductor with an inductance that is changed by the control signal from the control signal generator.

4. An optical receiver for receiving a signal light from a dispersive optical path, the signal light having a first frequency response with a bottom frequency between 2 GHz to 4 GHz due to the dispersion of the optical path, the optical receiver comprising:

a photodiode for converting the signal light to an electrical current;

a current-to-voltage converter for outputting a voltage signal corresponding to the electrical current;

a passive filter coupled to the current-to-voltage converter, the passive filter having a second frequency response compensating the first frequency response of the signal light, the second frequency response having a variable peak frequency controlled by a control signal; and a control signal generator for outputting the control signal to the passive filter, wherein the control signal generator includes a band-pass filter and a divider, the band-pass filter receiving the voltage signal from the current-to-voltage converter, and the divider outputting the control signal to the passive filter by dividing an output of the band-pass filter with the voltage signal.

5. The optical receiver according to claim 4, wherein the photodiode is an avalanche photodiode.

6. the optical receiver according to claim 4, wherein the passive filter includes at least an inductor with an inductance that is changed by the control signal from the control signal generator.

* * * * *